United States Patent [19]

Petersen

[11] 4,349,863

[45] Sep. 14, 1982

[54] EMERGENCY LIGHTING SYSTEM

[75] Inventor: Warren A. Petersen, Ridgefield, Conn.

[73] Assignee: Tork, Inc., Mount Vernon, N.Y.

[21] Appl. No.: 141,819

[22] Filed: Apr. 21, 1980

[51] Int. Cl.[3] .......................... F21V 19/04; H02H 7/00

[52] U.S. Cl. ........................................ 362/20; 307/64; 307/66; 315/86; 362/183; 362/254; 362/802

[58] Field of Search ................. 362/20, 183, 802, 254; 307/64, 66; 315/86

[56] References Cited

U.S. PATENT DOCUMENTS

| | | | |
|---|---|---|---|
| 3,739,226 | 6/1973 | Seiter et al. | 362/20 |
| 4,029,993 | 6/1977 | Alley et al. | 315/86 |
| 4,034,259 | 7/1977 | Schoch | 362/20 |
| 4,056,757 | 11/1977 | Mauch et al. | 315/86 |
| 4,150,302 | 4/1979 | Roche | 362/20 |
| 4,214,185 | 7/1980 | Breeze | 362/20 |
| 4,216,410 | 8/1980 | Feldstein | 315/86 |
| 4,223,232 | 9/1980 | Bulat | 362/20 |

*Primary Examiner*—Irwin Gluck

*Attorney, Agent, or Firm*—John F. Ohlandt

[57] ABSTRACT

A lighting system for supplying AC power normally, and DC power on an emergency basis selectively, to electron discharge devices, particularly fluorescent lamps; thus, the AC or DC power is furnished over common lines to a high frequency inverter associated with each lamp or lamp fixture; the arrangement is such that substantially no extra wire or wiring is required for the emergency lighting, whether the installation be a new one or retrofitted. In the latter case, new style electronic ballasts replace the old or core type ballasts in those fixtures that are to provide the emergency lighting; such electronic ballasts including the aforesaid inverter capabilities.

5 Claims, 2 Drawing Figures

EMERGENCY LIGHTING SYSTEM

BACKGROUND, OBJECTS AND SUMMARY OF THE INVENTION

The present invention pertains to a lighting system and, more particularly, to a system which is readily adapted to provide emergency lighting in a new installation, or to be incorporated in an already existing lighting installation by retrofitting. In the latter case, substantially no extra wiring is required.

The lighting system of the present invention is concerned with supplying power on an emergency basis due to power outages, for example, to electron discharge devices, such as fluorescent lamps or the like, whereby the same fluorescent lamps that function in an emergency also provide illumination in normal circumstances; that is to say, when no emergency exists.

Prior art systems, and specifically those that contemplate the supply of power to fluorescent lamps or fluorescent fixtures, have taken a variety of approaches in the attempt to achieve efficient operation. One such system, which has the objective of providing emergency power by means of the same wiring that is used to provide the utility power to fluorescent lights, is that disclosed in U.S. Pat. No. 4,056,757. That system eschews the kinds of schemes which involve locating batteries and associated components in or near the light fixture, since it concludes that the components would thereby be operating in a hostile environment, with the very significant degrading factor being the well-known sensitivity of batteries to heat. That same patent also notes that with such schemes some additional wiring, other than that needed to operate from the utility power, is required, and such additional wiring is expensive and may be inconvenient to provide.

Another approach that is followed in certain prior art emergency lighting systems involves locating components needed for the emergency lighting remote from the light fixtures, in which case separate wiring is required to transmit emergency power to the light fixtures. Such an approach results in inefficiencies because the additional extended wiring adds considerably to the expense of the system, and is inconvenient to install, particularly in existing buildings.

Whatever the merits of the system disclosed in U.S. Pat. No. 4,056,757, and these involve the aforenoted advantage of providing the emergency power by means of the same wiring used to provide utility power, there remains the fact that such system relies on the operation of a central inverter. However, such inverter units are very expensive and are trouble-prone. Moreover, special ballasts are required to discriminate between the normal supply condition, that is, when utility power is available, and the emergency power condition such that only selected fixtures will be illuminated when the latter condition prevails.

Accordingly, it is a primary object of the present invention to overcome the noted drawbacks and difficulties normally found in prior art systems.

To provide further background for consideration of the present invention, reference may also be made to the following: U.S. Pat. No. 3,448,335 in which a high frequency AC-DC fluorescent lamp driver circuit is described; U.S. Pat. No. 3,356,891 in which an automatic substitution of a standby power source is made operative only when particular fluorescent lamps are connected in circuit; U.S. Pat. No. 3,684,891 in which a localized battery emergency power supply system is described.

Broadly stated, the present invention provides a lighting system in which selected ones of the lighting fixtures, used for providing normal illumination from an AC utility power supply, can likewise be used to furnish illumination under emergency conditions from a DC power supply. The system includes an individual inverter power supply for substantially continuously supplying high frequency power to each of the fluorescent light fixtures involved. Moreover, each of the inverters supplies high frequency power, i.e., of the order of 20 KHz, whether it be the AC supply or the emergency DC supply that is connected to the input of the inverters. A transfer means effects the changeover whereby only selected lighting fixtures function for emergency lighting purposes. In a preferred embodiment, a switching means is connected to the branch circuit or circuits having the particular ones of the lighting fixtures that will provide the emergency lighting, and the DC power supply is selectively connected to only these branch circuits, transmission of DC being accomplished by the same conductors that ordinarily furnish AC. A rectifier is included at the input to each inverter to convert the incoming AC, when present, to DC, which is the appropriate input supply for the inverter.

In accordance with a specific embodiment of the present invention, a typical system would involve the lighting of a large-scale area, for example, requiring on the order of 100 fixtures and each typically having two fluorescent lamps or lights. Such large-scale installation would include a number of branch circuits, for example, ten branch circuits, each supplying ten fixtures. One of these branch circuits would be an emergency lighting branch circuit and could also be used alternatively as a "night light" circuit which typically functions twenty-four hours a day under utility power. This emergency branch circuit would supply suitably spaced emergency fixtures so that the entire room would receive complete illumination, but, of course, at a much reduced wattage level.

It will therefore be appreciated that the present invention enables the functioning of all fluorescent fixtures under normal circumstances and permits a diffused low level emergency illumination from selected ones of the very same fixtures which provide the normal illumination.

Each of the individual inverters associated with each of the fluorescent fixtures may be of the type disclosed in U.S. Pat. No. 4,017,785, the disclosure of which is incorporated herein by reference. Such an inverter operates to supply high frequency power to a pair of fluorescent lamps at the output of the inverter. This frequency is usually selected to be above 20,000 Hz. Such an inverter or "electronic ballast" enables an increase in efficiency of a given fixture of approximately 25% and is therefore ideal for the conservation of energy in present day circumstances.

Other and further objects, advantages and features of the present invention will be understood by reference to the following specification in conjunction with the annexed drawing, wherein like parts have been given like numbers.

DESCRIPTION OF PREFERRED EMBODIMENT

Figures 1, 2:
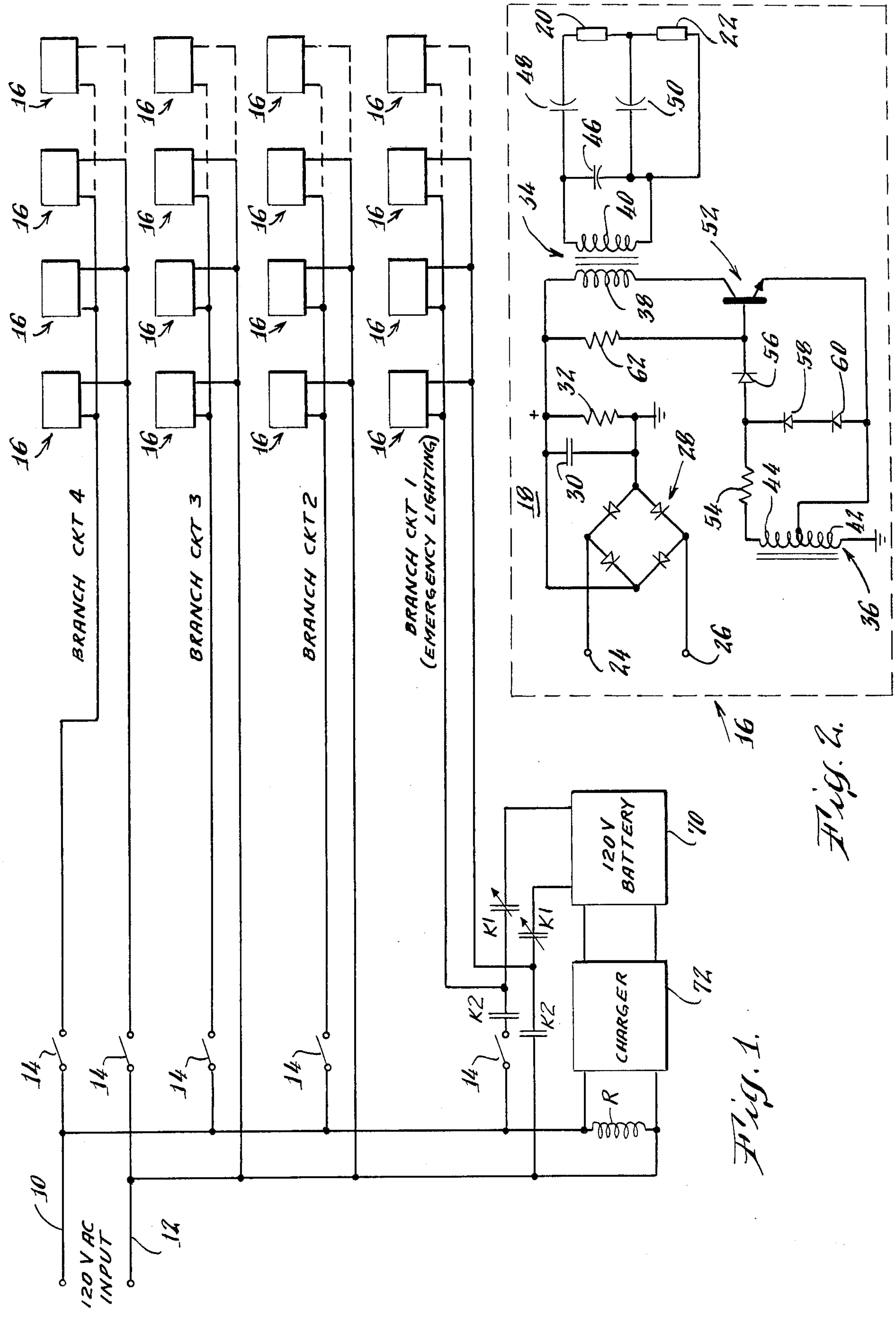
FIG. 1 is a schematic diagram of the system of the present invention.
FIG. 2 is a schematic diagram of the inverter power supply circuit associated with each lighting fixture.

Referring now to the figures of the drawing, there will be seen in FIG. 1 a schematic diagram of the system of the present invention in which the utility supply of 120 volt AC is seen at the upper left, being supplied on the lines 10 and 12. The lines 10 and 12 extend and subdivide into separate branch circuits, such being illustrated as four in number and designated branch circuits 1, 2, 3, and 4, each of which is suitably fused and is provided with a control switch 14 so that AC power can be selectively applied to each of the groups of fluorescent lighting fixture 16 in each of the branch circuits.

Referring now to FIG. 2 there will be seen a representative lighting fixture 16 each of which includes an inverter power supply 18 connected to supply the high frequency oscillations to a pair of lamps 20 and 22 providing the light output from that fixture. As will be appreciated, the input terminals 24 and 26 are connected by way of suitable leads across an individual branch circuit.

In order that the typical fixture 16 can handle both an AC power supply and a DC supply, the terminals 24 and 26 are connected to a full wave bridge rectifier 28 so as to provide, from the 120 volt AC utility supply, a rectified DC supply across a filter capacitor 30 and resistor 32. Of course, in the case of an emergency, where DC exists across the terminals 24, 26, this will be passed by the appropriately poled diodes in the bridge rectifier 28.

It will be appreciated by reference to FIG. 1 of U.S. Pat. No. 4,127,797 that the essential circuitry therein is the same as that illustrated here in FIG. 2, except that the latter includes the aforenoted bridge rectifier 28, capacitor 30 and resistor 32.

The inverter circuit 18 includes a first transformer 34 and a second transformer 36. Transformer 34 has a primary winding 38 and a secondary winding 40. Transformer 36, which is preferably an auto transformer, has a first winding 42 and a second winding 44. The secondary winding 40 is connected across the fluorescent lamps 20 and 22 in a conventional manner by way of the capacitors 46, 48 and 50. The primary winding 38 of transformer 34 is connected in series with the winding 42 of transformer 36, across the DC supply, whether that is rectified from the utility AC, or is the emergency battery supply. The second winding 44 of transformer 36 is connected in a feedback circuit to the base of transistor 52 by way of a resistor 54 and a diode 56. Further diodes 58 and 60 are connected in shunt across the combination of the winding 44 and resistor 54.

In operation of the inverter power supply circuit, the emitter current of transistor 52 flows through the winding 42, which results in inducing a voltage in feedback winding 44 which forward biases the diode 56 and reverse biases diode 58 and 60. The induced voltage produces a current flow to the function between windings 42 and 44, by way of the series circuit including resistor 54, diode 56 and the base emitter circuit of transistor 52. When transistor 52 switches, the back EMF of winding 44 produces a current flow through diodes 58 and 60 and winding 44. A low impedance is reflected into winding 42, the current of which generates the base-emitter current in the transistor 52.

A resistor 62 serves as a starting resistor, raising the base voltage of transistor 52 to the level required to initiate oscillations which, with the circuit illustrated are on the order of 20,000 Hz. This is an advantageous output since it is above normal hearing range and is extremely efficient from the standpoint of fluorescent lamp operation.

It will be understood that the system of the present invention contemplates that a selected branch circuit will have DC power supplied to it under emergency conditions; that is to say, when for any reason the 120 volt AC utility power supply is discontinued. Accordingly, the lowermost branch circuit, that is, branch circuit 1 seen in FIG. 1, includes an arrangement for transferring to an emergency power supply, comprising a battery 70. This battery is connected to a charger device 72 which includes, in a conventional manner, a suitable rectifier for converting incoming AC to DC such that an appropriate charge can be supplied to the battery 70 at all times except when emergency conditions occur, i.e., AC utility power fails.

A relay R is connected to branch circuit 1 such that utility AC power is ordinarily flowing through the relay, whereby the contacts K1 in the leads from the battery 70 are changed from the normally closed indication to the open state. Correspondingly, the normally open contacts K2 are closed when the relay R is energized with AC power. However, in the event that the utility power supply should discontinue for any reason such that the relay R is no longer supplied with current, the contacts K1 will close and contacts K2 will open. Consequently, the battery supply output will be transmitted over branch circuit 1 to the fluorescent lamps in that branch circuit. Individual inverters in each of the fluorescent fixtures 16 in that branch circuit 1 will continue to operate, for the reason given, in the same way as if utility AC power were still being supplied. Hence, the particular fluorescent fixtures will continue to provide illumination as before.

It will be understood, of course, that in the precise embodiment depicted in FIG. 1, the case of a new installation or a completely retrofitted installation was assumed; hence all of the fluroescent fixtures 16 would be ones in which high frequency inverter power supply circuits 18 would be incorporated. Instead, if desired, a partial retrofit could be undertaken whereby only those fixtures destined for emergency lighting purposes would have their ballast replaced by the inverter/ballast of FIG. 2, so as to provide a high frequency output to their lamps. Other lamps, in fixtures having standard core ballasts, would continue to operate with normal power under non-emergency conditions.

Also, instead of the precise embodiment described, selectivity could be based upon some frequency discriminating scheme, such that only predetermined individual fixtures that are to serve for emergency lighting would be lighted. Thus, for example, DC power under emergency conditions could be connected to particular branch circuits, but those fixtures in the branch circuits having a series-connected capacitor would block the DC and hence not be lighted, while the others—the emergency fixtures—would be lighted.

While there have been shown and described what are considered at present to be the preferred and alternate embodiments of the present invention, it will be appreciated by those skilled in the art that modifications of such embodiments may be made. It is therefore desired that the invention not be limited to these embodiments, and it is intended to cover in the appended claims all such modifications as fall within the true spirit and scope of the invention.

I claim:

1. An emergency lighting system in which selected ones of the lighting fixtures used for providing normal illumination from an AC utility power supply available at their inputs, can likewise be used to furnish illumination from an emergency DC power supply available at the same inputs, said DC power supply being operatively connected to said lighting fixtures under emergency conditions when said AC utility power supply is discontinued, comprising:

a plurality of branch circuits, each having a plurality of lighting fixtures connected therein;

an AC utility power supply normally connected by said branch circuits to said inputs on said lighting fixtures;

a selected branch circuit being provided with emergency lighting fixtures, each of said emergency lighting fixtures comprising an electron discharge lighting device, a high frequency inverter power supply, and a rectifier;

each inverter power supply and each rectifier having an input and an output; the input of said rectifier being continuously connected to said selected branch circuit; the output of said rectifier being continuously connected to the input of said inverter power supply; the output of said inverter power supply being continuously connected to a respective electron discharge lighting device for supplying high frequency power to said lighting device irrespective of whether or not said AC utility power supply is discontinued;

an emergency DC power supply; and, transfer means responsive to discontinuance of said AC utility power supply for selectively illuminating said emergency lighting fixtures, including switching means for connecting said selected branch circuit to said emergency DC power supply.

2. A lighting system as defined in claim 1, in which all of said emergency lighting fixtures are connected in said selected branch circuit.

3. A lighting system as defined in claim 1, in which said emergency DC power supply is a battery centrally located remote from said lighting fixtures.

4. A lighting system as defined in claim 3, in which said emergency DC power supply further includes a charging device for continuously supplying an appropriate DC charging current to said battery, except when said AC supply is discontinued.

5. A lighting system as defined in claim 1, in which said switching means for connecting said selected branch circuit to said emergency DC power supply includes a relay coil connected to said AC utility power supply and normally closed relay contacts connected to said selected branch circuit.

* * * * *